(12) United States Patent
Zhou et al.

(10) Patent No.: US 12,314,115 B2
(45) Date of Patent: May 27, 2025

(54) POWER CONSUMPTION MANAGEMENT METHOD AND RELATED DEVICE

(71) Applicant: Huawei Technologies Co., Ltd., Shenzhen (CN)

(72) Inventors: Luoqing Zhou, Hangzhou (CN); Weixiang Jiang, Hangzhou (CN); Junjie Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 83 days.

(21) Appl. No.: 18/181,688

(22) Filed: Mar. 10, 2023

(65) Prior Publication Data

US 2023/0214002 A1   Jul. 6, 2023

Related U.S. Application Data

(63) Continuation of application No. PCT/CN2021/106819, filed on Jul. 16, 2021.

(30) Foreign Application Priority Data

Sep. 11, 2020 (CN) .......................... 202010953911.1

(51) Int. Cl.
| | | |
|---|---|---|
| *G06F 1/26* | (2006.01) | |
| *G06F 1/32* | (2019.01) | |
| *G06F 1/3293* | (2019.01) | |
| *G06F 9/48* | (2006.01) | |

(52) U.S. Cl.
CPC .......... *G06F 1/3293* (2013.01); *G06F 9/4875* (2013.01); *G06F 9/4893* (2013.01)

(58) Field of Classification Search
CPC .... G06F 1/3293; G06F 9/4875; G06F 9/4893; G06F 1/3228; G06F 1/324; G06F 1/3243; G06F 1/3287; G06F 1/329; G06F 1/3296; G06F 1/3206; G06F 9/505; Y02D 10/00
See application file for complete search history.

(56) References Cited

U.S. PATENT DOCUMENTS

| | | | | |
|---|---|---|---|---|
| 10,372,198 B2 * | 8/2019 | Weissmann | ........... | G06F 9/5094 |
| 2002/0188910 A1 * | 12/2002 | Zizzo | ...................... | G06F 30/30 |
| | | | | 716/103 |
| 2010/0262971 A1 * | 10/2010 | Yamada | .................. | G06F 9/505 |
| | | | | 718/104 |
| 2011/0004775 A1 * | 1/2011 | Svensson | .............. | G06F 1/3296 |
| | | | | 713/320 |

(Continued)

FOREIGN PATENT DOCUMENTS

| | | |
|---|---|---|
| CN | 101076770 A | 11/2007 |
| CN | 112181124 A | 1/2021 |

*Primary Examiner* — Xuxing Chen
(74) *Attorney, Agent, or Firm* — Slater Matsil, LLP (57) ABSTRACT

A power consumption management method and a related device are provided. The method may be used to manage power consumption of a device including a plurality of voltage domains, where each of the voltage domains includes at least one processor core. The method includes: during power consumption management, identifying a first voltage domain that meets a preset condition in a plurality of voltage domains, migrating tasks to be executed by all processor cores in the first voltage domain to a second voltage domain, and then setting each of working modes of components in the first voltage domain as a first mode.

18 Claims, 6 Drawing Sheets

(56) References Cited

U.S. PATENT DOCUMENTS

| | | | |
|---|---|---|---|
| 2011/0264902 A1* | 10/2011 | Hollingworth | G06F 1/3203 |
| | | | 713/324 |
| 2014/0173623 A1* | 6/2014 | Chang | G06F 9/5094 |
| | | | 718/105 |
| 2014/0281610 A1 | 9/2014 | Biswas et al. | |
| 2015/0347184 A1* | 12/2015 | Kim | G06F 9/5088 |
| | | | 718/104 |
| 2016/0004569 A1* | 1/2016 | Kim | G06F 9/5027 |
| | | | 718/104 |
| 2016/0170470 A1* | 6/2016 | Kannan | G06F 1/329 |
| | | | 713/320 |
| 2016/0239074 A1 | 8/2016 | Lee et al. | |
| 2017/0168872 A1* | 6/2017 | Kim | G06F 9/4887 |
| 2019/0065372 A1* | 2/2019 | Roychowdhury | G06F 12/0811 |
| 2019/0108066 A1* | 4/2019 | Kim | G06F 9/4856 |
| 2020/0409450 A1* | 12/2020 | Hovis | G06F 1/3296 |
| 2021/0409209 A1* | 12/2021 | Chhabra | H04L 9/0877 |
| 2022/0038376 A1* | 2/2022 | Mowat | H04L 47/2441 |

\* cited by examiner

POWER CONSUMPTION MANAGEMENT METHOD AND RELATED DEVICE

CROSS-REFERENCE TO RELATED APPLICATIONS

This application is a continuation of International Application No. PCT/CN2021/106819, filed on Jul. 16, 2021, which claims priority to Chinese Patent Application No. 202010953911.1 filed on Sep. 11, 2020. The disclosures of the aforementioned applications are hereby incorporated by reference in their entireties.

TECHNICAL FIELD

This application relates to the field of energy consumption technologies, and in particular, to a power consumption management method and apparatus, a scheduler, a device, and a computer-readable storage medium.

BACKGROUND

Energy consumption of a device is closely related to the operation costs of the device. Therefore, power consumption management on the device is always an important issue that affects the operation costs of the device. A conventional method is mainly used to evaluate and adjust, based on a current utilization rate of a processor, a device (for example, a mobile terminal) whose processor has a small quantity of processor cores that are significantly different from each other. However, this brings few benefits. An application scope is limited, and requirements of all types of processors cannot be met. Therefore, how to provide a power consumption management method with wider applicability becomes a technical problem to be urgently resolved.

SUMMARY

This application provides a power consumption management method and apparatus, a scheduler, a device, and a computer-readable storage medium, to provide a power consumption management method with wider applicability.

According to a first aspect, a power consumption management method is provided. The method may be applied to a device including a plurality of voltage domains, where each of the voltage domains includes at least one processor core. During power consumption management, the device may identify a first voltage domain that meets a preset condition, where the first voltage domain is any voltage domain in the device. Then, the device may migrate a task to be executed by a processor core in the first voltage domain to a second voltage domain, where the second voltage domain is a voltage domain other than the first voltage domain in the device. After migrating the task, the device may set each of working modes of components in the first voltage domain as a first mode, where the components in the first voltage domain include the processor core. In this way, power consumption management may be implemented for a device with a plurality of processor cores. Furthermore, the power consumption management method for a device may be applied to both a device with a small quantity of processor cores that are significantly different from each other and a device (for example, an SMP device) with a large quantity of processor cores that are slightly different from each other. Therefore, the power consumption management method is more widely applicable than a conventional power consumption management method for a device.

In addition, each of the working modes of the components in the first voltage domain is set as the first mode after migration, and the first mode is a mode with a lower or lowest working power consumption. When the device performs power consumption management in this way, power consumption of a processor core in the second voltage domain increases. However, not only power consumption of all processor cores in the first voltage domain can be reduced, but also power consumption of one or more components such as a QPI bus, a level 1 cache, and a level 2 cache in the first voltage domain can be reduced. As a result, power consumption of the entire device can be reduced.

In actual application, the device may migrate tasks to be executed by processor cores in a plurality of voltage domains to one or more cores in one or more second voltage domains, and set each of working modes of components in a plurality of first voltage domains as the first mode with lower power consumption. In this way, the power consumption of the device can be effectively reduced.

In addition, in the process of migrating the tasks of the plurality of first voltage domains to the one or more second voltage domains by the device, specific implementation of identification, task migration and working mode setting of each of the first voltage domains may be the same as the foregoing processing process of one first voltage domain.

In a possible implementation, that the device identifies a first voltage domain that meets a preset condition may be specifically: The device identifies the first voltage domain based on load statuses of the plurality of voltage domains in the device, where a load of the identified first voltage domain meets the preset condition. For example, the device may identify a voltage domain with a relatively low load in the plurality of voltage domains as the first voltage domain. Alternatively, when a total load of the plurality of voltage domains is less than a preset threshold, the device may identify any voltage domain as the first voltage domain, and identify any other voltage domain as the second voltage domain.

In a possible implementation, that the device identifies the first voltage domain based on load statuses of the plurality of voltage domains in the device may be specifically: The device selects, as the first voltage domain based on a load sequence of the plurality of voltage domains, a voltage domain whose load is less than or equal to a first load threshold in the plurality of voltage domains. When a load of a voltage domain is relatively low, there are usually a relatively small quantity of tasks on a processor core in the voltage domain. Therefore, there may be as few tasks as possible to be migrated from the first voltage domain with a relatively low load to another voltage domain.

In a possible implementation, the first load threshold may be a load value of a voltage domain with a lowest load in the plurality of voltage domains. Certainly, in another possible implementation, the first load threshold may alternatively be a preset fixed value or the like.

In a possible implementation, that the device identifies a first voltage domain that meets a preset condition may be specifically: The device identifies the first voltage domain according to a preset load balancing policy. For example, when the load balancing policy indicates that a voltage domain has a lower or lowest load, the device may identify the voltage domain as the first voltage domain.

In a possible implementation, when identifying the first voltage domain, the device may also identify the second voltage domain. A load of the first voltage domain is relatively low, that is, less than the first load threshold. A load of the second voltage domain is greater than a second load threshold, and the second voltage domain is a voltage domain whose load status is less than or equal to a third load threshold. For example, the second load threshold may be greater than or equal to the first load threshold. Certainly, in another possible implementation, the device may alternatively identify any voltage domain other than the first voltage domain as the second voltage domain or the like.

In a possible implementation, after the device migrates the task to be executed by the processor core in the first voltage domain to the second voltage domain, load distribution of the processor core in the second voltage domain satisfies the load balancing policy, where the load balancing policy is used to balance a load of the processor core in the second voltage domain. During specific implementation, the device may migrate, based on the load balancing policy, a plurality of tasks from the first voltage domain to processor cores in the second voltage domain in a balanced manner. In this way, after the tasks are migrated, a case in which some of the processor cores in the second voltage domain are overloaded with too many tasks while other processor cores in the second voltage domain are underloaded can be avoided as much as possible. As a result, performance degradation of the device caused by task migration can be avoided as much as possible. Certainly, in another possible implementation, the device may alternatively migrate tasks to the second voltage domain, and then perform load balancing on a plurality of processor cores in the second voltage domain.

In a possible implementation, when a quantity of voltage domains whose loads each are greater than the second load threshold in the plurality of voltage domains of the device is greater than a preset quantity, the device may perform load balancing on the plurality of voltage domains based on the load statuses of the plurality of voltage domains. In this implementation, when there are a relatively large quantity of overloaded voltage domains in the device, load balancing may be performed on all the voltage domains in the device, to avoid, as much as possible, performance degradation of the entire device caused by overloading some of the voltage domains in the device. In another possible implementation, when there are voltage domains whose loads each are greater than the second load threshold in the plurality of voltage domains of the device and whose quantity is less than a preset quantity, the device may perform load balancing on some voltage domains. Certainly, the some voltage domains include the voltage domains whose loads each are greater than the second load threshold.

In a possible implementation, the device may identify the first voltage domain and perform task migration in a low load scenario. Specifically, the device may calculate a total load of the plurality of voltage domains, and when the total load of the plurality of voltage domains is less than a fourth load threshold, the device identifies the first voltage domain that meets the preset condition, to further migrate the task to be executed by the processor core in the first voltage domain to the second voltage domain. Correspondingly, when a load of the entire device is relatively high, the device may skip migrating tasks, or may migrate some tasks or the like, to avoid performance degradation of the entire device caused by overloading the second voltage domain after task migration.

In a possible implementation, before identifying the first voltage domain that meets the preset condition, the device first identifies a correspondence between a processor core and a voltage domain in the device, so as to determine processor cores in the device that are grouped into one voltage domain. In actual application, a BIOS system in the device may record a voltage domain grouping status in an ACPI table by reading a component register, and then report the voltage domain grouping status to the device through an interrupt.

In a possible implementation, that the device sets each of working modes of components in the first voltage domain as a first mode may be specifically: The device first predicts idle duration of the processor core in the first voltage domain, and then sets each of the working modes of the components in the first voltage domain as the first mode based on the idle duration. In actual application, the components in the first voltage domain each may have a plurality of types of working modes. When the component in the first voltage domain enters each of the working modes, there is a requirement for duration for which the component in the first voltage domain stays in the working mode. Therefore, the device may determine, by predicting idle duration of the components in the first voltage domain, a working mode to which each of the components in the first voltage domain is set.

In a possible implementation, after the device migrates the task to be executed by the processor core in the first voltage domain to the second voltage domain, a load of the second voltage domain is not greater than a fifth load threshold. During specific implementation, before performing task migration, the device may first predict an amount by which a load of the second voltage domain increases after the task that is to be executed by the processor core in the first voltage domain and that is to be migrated is migrated to the second voltage domain, and calculate a sum of the predicted amount by which the load increases and a current load of the second voltage domain. Then, the device may determine whether the sum exceeds the fourth load threshold. If the load sum does not exceed the fourth load threshold, the device may migrate the task to be executed by the processor core in the first voltage domain to the second voltage domain. After the task is migrated, the load of the second voltage domain is usually less than the fourth load threshold. However, if the load sum exceeds the fourth load threshold, it indicates that if the device migrates the task from the first voltage domain to the second voltage domain, the load of the second voltage domain may exceed the fourth load threshold. Consequently, performance of the device may be affected due to an overload on the second voltage domain. In this case, the device may skip migrating the task from the first voltage domain to the second voltage domain, or migrate only some tasks or the like to the second voltage domain.

In a possible implementation, the device may further present a power consumption management result on a preset display interface for a user (for example, an operation and maintenance personnel) to view. The presented power consumption management result may include, for example, any one or more of an identifier and power consumption that are of each of the plurality of voltage domains, an identifier, a working mode, power consumption, an operating frequency, a voltage, a utilization rate, and a proportion of duration of staying in the first mode that are of a processor core, and a temperature of a component. Power consumption information of the voltage domains is presented on the interface, so that the maintenance personnel can directly learn a power consumption status of the device.

In a possible implementation, that voltages of processor cores in the voltage domain are regulated together may be specifically: Voltages of all processor cores in the voltage domain are controlled together by using an independent power supply or module.

According to a second aspect, this application provides a power consumption management apparatus, where the power consumption management apparatus includes modules configured to perform the power consumption management method according to the first aspect or any one of the possible implementations of the first aspect.

According to a third aspect, this application provides a scheduler, including a processor and a memory, where the memory is configured to store computer instructions, and the processor is configured to perform, according to the computer instructions, operation steps of the power consumption management method according to any one of the first aspect or the possible implementations of the first aspect.

According to a fourth aspect, this application provides a device, where the device may include the foregoing scheduler and is configured to perform operation steps of the power consumption management method according to any one of the first aspect or the implementations of the first aspect.

According to a fifth aspect, this application provides a computer-readable storage medium, where the computer-readable storage medium stores instructions, and when the instructions are run on a computer, the computer is enabled to perform operation steps of the method according to any one of the first aspect or the possible implementations of the first aspect.

According to a sixth aspect, this application provides a computer program product including instructions. When the computer program product runs on a computer, the computer is enabled to perform operation steps of the method according to any one of the first aspect or the possible implementations of the first aspect.

In this application, more implementations may be provided by further combining the implementations of the foregoing aspects.

DETAILED DESCRIPTION OF ILLUSTRATIVE EMBODIMENTS

The following describes technical solutions of this application with reference to the accompanying drawings in embodiments of this application.

A device may be equipped with an energy aware scheduler (EAS). The EAS is a module for arranging a process for a processor core (core) to execute a task, and may manage scheduling of a task on the processor core based on information, such as power consumption, performance, and a load difference, of the processor core, to reach a maximum ratio of performance to power consumption, namely, MAX (performance/power). Performance of the device includes, but is not limited to, computing efficiency, a computing capability, and the like of the device.

During power consumption management on the device, power consumption of the device may be reduced as much as possible, to reduce operation costs of the device and therefore reach the maximum ratio of performance to power consumption. The power consumption is a power loss, that is, a difference between an input power and an output power of the device or a component on the device. Power consumption management on the device may be specifically power consumption management on each processor core in the device and power consumption management on one or more other components associated with the processor core. However, a current manner in which power consumption management is performed on a device based on a current utilization rate of a processor is generally applicable to only a device with a small quantity of processor cores that are significantly different from each other, and brings few benefits to other devices.

On this basis, an embodiment of this application provides a power consumption management method, to implement effective power consumption management on a device. The power consumption management method is more widely applicable. Specifically, the power consumption management method may be applied to a device including a plurality of voltage domains (VDs). Each of the voltage domains includes at least one processor core. Voltages of processor cores in a same voltage domain may be controlled together. During power consumption management, the device may identify a first voltage domain among the plurality of voltage domains that meets a preset condition, and migrate all tasks to be executed by a processor core in the first voltage domain to a second voltage domain. The first voltage domain is any one of the plurality of voltage domains, and the second voltage domain is a voltage domain other than the first voltage domain in the device. After the tasks are migrated, there may be no task running on the processor core in the first voltage domain, and the device may set each of working modes of components in the first voltage domain as a first mode. The first voltage domain includes components whose power consumption can be adjusted. The components include the processor core, and also include one or more other electronic components, such as a quick path interconnect (QPI) bus, a cache, and a controller of an on-die memory controller, associated with the processor core. In this way, power consumption management is implemented for the device. Furthermore, in the power consumption management method, power consumption management on a device is implemented by migrating tasks and setting working modes of components. Therefore, the power consumption management method is applicable to both a device with a small quantity of processor cores that are significantly different from each other and a device, such as a symmetric multi-processor (SMP) device, with a large quantity of processor cores that are slightly different from each other.

In addition, each of the working modes of all the components in the first voltage domain is set as the first mode after migration, and the first mode is a mode with lower or lowest power consumption. Therefore, not only power consumption of the processor core in the first voltage domain can be reduced, but also power consumption of the one or more associated components, such as the QPI bus, other than the processor core in the first voltage domain can be reduced. A task is properly scheduled on a processor core in a voltage domain for processing. In this case, scheduling and control can be performed on voltage domains, to minimize a quantity of operating voltage domains. As a result, power consumption of the entire device can be effectively reduced.

Besides, during power consumption management on the device, a computing process for a task scheduling is relatively simple. Therefore, there are a relatively small quantity of computing resources consumed for task scheduling, and a task scheduling delay is relatively short.

For example, the device to which the power consumption management method is applied may be, for example, a computing device with a plurality of voltage domains, a network device with a plurality of voltage domains, or a storage device with a plurality of voltage domains. The computing device may be, for example, a server or an intelligent terminal that provides a computing service. The network device may be a device or the like that accesses a network and provides a network service. The storage device may be, for example, a storage server.

Figure 1:
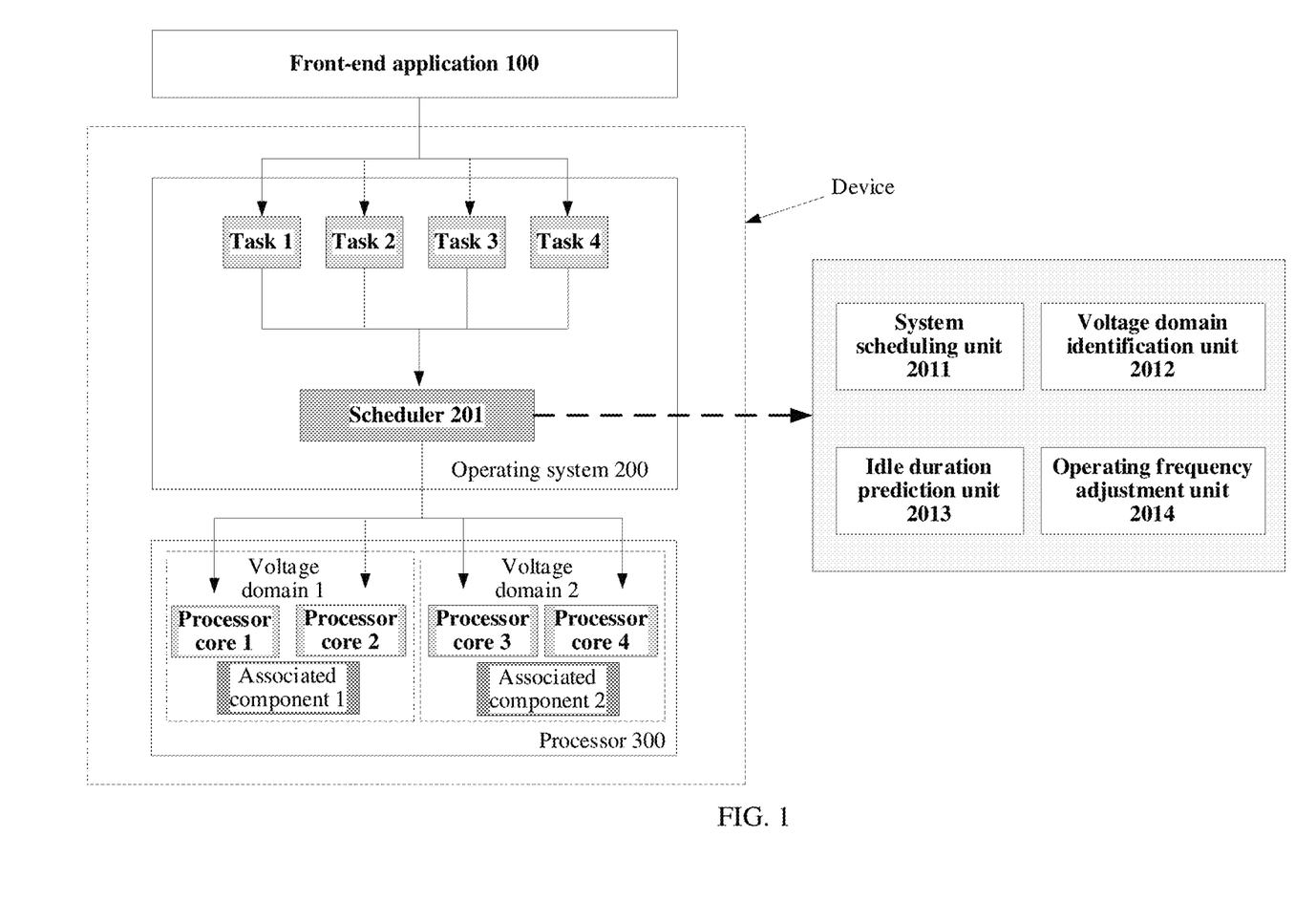
FIG. 1 is a schematic diagram of a system architecture according to this application.

As an example, the device to which the power consumption management method is applied may have a system architecture shown in FIG. 1, and specifically, the foregoing power consumption management process may be performed by a scheduler 102 shown in FIG. 1. The system architecture shown in FIG. 1 may include an operating system 200 and a processor 300 including a plurality of processor cores, and the device may perform communication interaction and the like with a front-end application 100. An example in which the system architecture shown in FIG. 1 includes one processor 300 is used for description. In actual application, the system architecture may include a plurality of processors. The processor 300 shown in FIG. 1 may include four processor cores: a processor core 1, a processor core 2, a processor core 3, and a processor core 4. In addition, the four processor cores may be grouped into two voltage domains based on a physical hardware structure. Voltages of processor cores in each of the voltage domains may be controlled together. The processor core 1 and the processor core 2 may be grouped into a voltage domain 1, and the processor core 3 and the processor core 4 may be grouped into a voltage domain 2. In addition, the voltage domain 1 may further include another component, namely, an associated component 1 shown in FIG. 1, that is logically or physically associated with the processor core 1 and the processor core 2. The associated component may be configured to support working of the processor core 1 and the processor core 2, and may be one or more of components such as a QPI bus, a level 3 cache (L3 cache), an on-die memory controller, a snoop agent pipeline, and a thunderbolt. Likewise, the voltage domain 2 may also include another component, namely, an associated component 2, that is logically or physically associated with the processor core 3 and the processor core 4.

Figure 2:
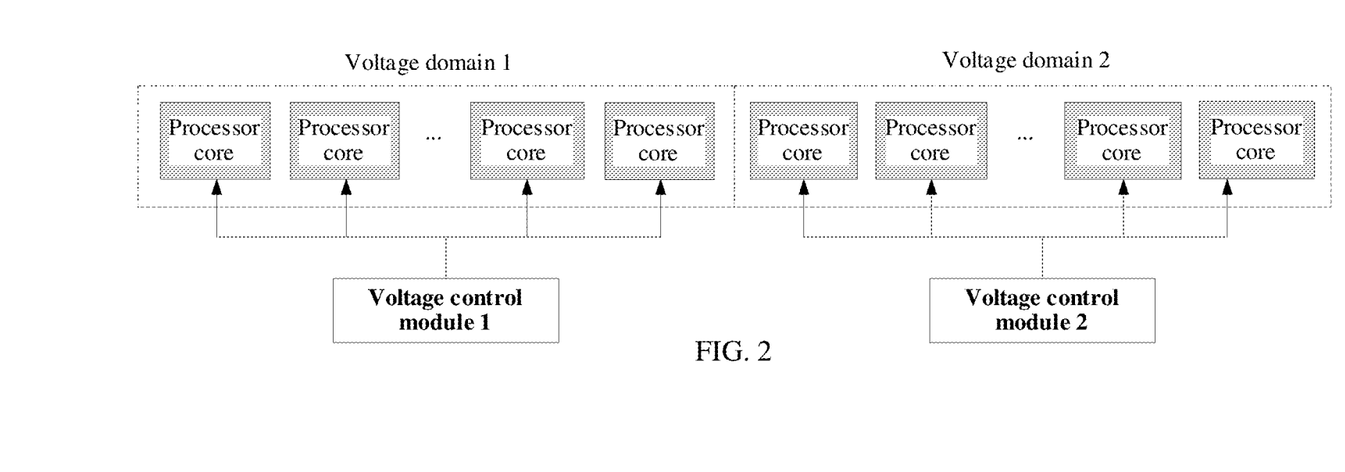
FIG. 2 is a schematic diagram of voltage domain grouping according to this application.

The voltage domain may be understood as an area, in which voltages are allowed to be controlled together, in a chip (for example, a processor chip). In one area, voltages of the processor cores may be controlled together by using an independent voltage power supply and module. One chip may include one or more voltage domains. For example, in a device shown in FIG. 2, one processor includes two voltage domains, and each of the voltage domains may include several processor cores. Voltages of a plurality of processor cores in a voltage domain 1 may be controlled together by using a voltage control module 1. Voltages of a plurality of processor cores in a voltage domain 2 may be controlled together by using a voltage control module 2. A plurality of processor cores in one processor may be grouped into different voltage domains. In other words, one processor may include a plurality of voltage domains. As shown in FIG. 1, the processor 300 may include the two different voltage domains. The voltage control module 1 and the voltage control module 2 may be components or logic circuits in the processor 300 in FIG. 1, or may be software logic functions implemented by the foregoing components or logic circuits. The voltage control module 1 and the voltage control module 2 are configured to control power consumption of the processor cores and associated components in the voltage domains. Optionally, in the device shown in FIG. 1, the voltage control module 1 and the voltage control module 2 may alternatively be combined, so that the two voltage domains are separately controlled by one voltage control module.

The scheduler 201 may be implemented by software. For example, the scheduler 201 may be a computer program run on the operating system 200, and is configured to perform task scheduling. Specifically, the front-end application 100 may generate one or more tasks. In FIG. 1, an example in which four tasks (a task 1 to a task 4) are generated is used for description. The scheduler 201 may schedule the tasks to one or more of the processor 1 to the processor core 4, so that the processor cores execute the tasks. During scheduling, the scheduler 201 may perform the power consumption management method: migrate all tasks to be executed by the processor cores in the voltage domain 1 to the processor cores in the voltage domain 2, and then control each of the processor core 1, the processor core 2, and the associated component 1 that are in the voltage domain 1 to enter a working mode with low power consumption. In this way, the scheduler 201 completes power consumption management on the device.

Specifically, a system scheduling unit 2011, an idle duration prediction unit 2012, a voltage domain identification unit 2013, and an operating frequency adjustment unit 2014 may be integrated into the scheduler 201. The system scheduling unit 2011 is configured to perform load balancing on all the voltage domains in the device when a quantity of overloaded voltage domains in the device exceeds a preset threshold. For example, the system scheduling unit 2011 is a Linux scheduler (scheduler). The voltage domain identification unit 2012 is configured to identify a status of distribution of the processor cores in the voltage domains of in the device. In other words, the voltage domain identification unit 2012 is configured to identify that in the device, the processor core 1 and the processor core 2 belong to the voltage domain 1, and the processor core 3 and the processor core 4 belong to the voltage domain 2. The idle duration prediction unit 2013 is configured to predict idle duration of a processor core in a voltage domain, so as to set a working mode of the processor core to a corresponding mode, such as an idle mode (CPUidle) of Linux, based on the idle duration of the processor core. The operating frequency adjustment unit 2014 is configured to perform adjustment, including increasing or decreasing, on an operating frequency of the processor core, such as an operating frequency (CPUfreq) of Linux, based on a load of the processor core.

Optionally, in addition to the foregoing policy of performing load balancing on all the voltage domains, the system scheduling unit 2011 may be configured with another policy, for example, a policy of performing load balancing on one voltage domain. The scheduler 201 may perform load balancing on a processor core in a second voltage domain based on the load balancing policy in a process of migrating the tasks from a first voltage domain to the second voltage domain. In actual application, a policy of the scheduler 201 is not limited to the foregoing examples.

Optionally, to improve a computing capability of the scheduler, the functions of the scheduler may alternatively be implemented by using separate hardware, for example, an application-specific integrated circuit (ASIC) or a programmable logic device (PLD). The PLD may be a complex programmable logic device (CPLD), a field-programmable gate array (FPGA), a generic array logic (GAL), or any combination thereof, used to implement the functions of the scheduler.

It should be understood that the system architecture shown in FIG. 1 is merely used as an example for description, and is not intended to limit a system architecture to which this embodiment is applicable. In actual application, some components, or function modules or units in the system architecture may be adaptively added, deleted, or replaced. For example, the front-end application shown in FIG. 1 may alternatively be located on a device, or the processor 300 in FIG. 1 may include more processor cores, or the device may further include another processor in addition to the processor 300. This is not limited in this embodiment.

Figure 3:
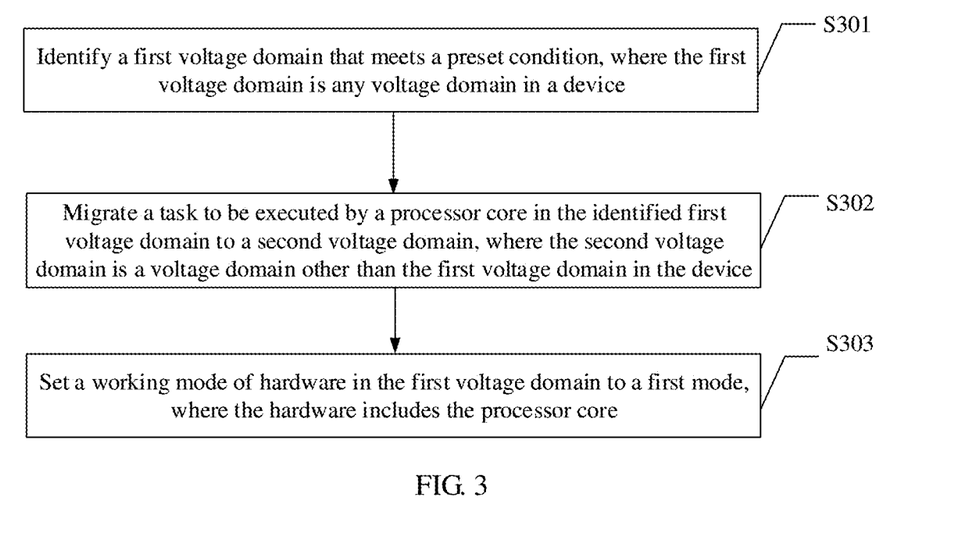
FIG. 3 is a schematic flowchart of a power consumption management method according to this application.

FIG. 3 is a schematic flowchart of a power consumption management method according to an embodiment of this application. The method may be applied to a device having the system architecture shown in FIG. 1 or another device including a plurality of voltage domains. This is not limited in this embodiment. An example in which the power consumption management method is applied to the device shown in FIG. 1 is used. As shown in FIG. 3, the power consumption management method may be specifically performed by the scheduler 201 in FIG. 1. The method includes the following specific steps.

S301: Identify a first voltage domain that meets a preset condition, where the first voltage domain is any voltage domain in the device.

For example, before identifying the first voltage domain, the scheduler may first identify a correspondence between each processor core and a voltage domain in the device. In other words, the scheduler may identify processor cores in the device that are grouped into one voltage domain, to determine each voltage domain and a processor core included in each voltage domain in the device. The identified correspondence between the processor core and the voltage domain may be stored in a storage area, such as a memory, of the device. In some examples, a basic input/output system (BIOS) in the device may record a voltage domain grouping status in an advanced configuration and power interface (ACPI) table in the device by reading a hardware register, and then report the voltage domain grouping status in the power management interface table to the device.

A voltage domain that meets the preset condition may be identified among a plurality of voltage domains in the device. For ease of description, the voltage domain that meets the preset condition is referred to as the first voltage domain hereinafter.

In a possible implementation, that the first voltage domain meets the preset condition may be specifically: A load of the first voltage domain meets the preset condition. In this case, during identification of the first voltage domain, the first voltage domain may be selected based on load statuses of the plurality of voltage domains in the device. A load of each of the voltage domains is a sum of loads of all processor cores in the voltage domain. The sum of the loads of all the processor cores in the voltage domain may be calculated by a per-entity load tracking (PELT) module in the device. Particularly, when a utilization rate of a processor core exceeds 80%, the utilization rate of the processor core may be used to describe a load of the processor core. For example, a value of the utilization rate of the processor core may be used to describe a value of the load of the processor core.

In a possible implementation, the load of the first voltage domain may be less than a load of another voltage domain in the plurality of voltage domains. For example, the plurality of voltage domains may be sorted based on load values, and a voltage domain with a lowest load may be selected from the plurality of voltage domains as the first voltage domain based on a result of sorting.

In another possible implementation, the first voltage domain may alternatively be a voltage domain whose load is not greater than the first load threshold. The first load threshold may be a smallest value among loads in the plurality of voltage domains. Correspondingly, the first voltage domain is a voltage domain with a lowest load in the plurality of voltage domains. Optionally, a value, such as 10%, obtained based on experience or statistical data may be used as a preset value to limit the first load threshold. In this case, a voltage domain whose load is less than 10% in the plurality of voltage domains may be determined as the first voltage domain. Certainly, the foregoing implementation of determining the first voltage domain is merely used as an example. Specific implementation of determining the first voltage domain with a relatively low load from the plurality of voltage domains in actual application is not limited in this embodiment.

In still another possible implementation, in addition to the manner of determining the first voltage domain based on the loads of the voltage domains, the first voltage domain may be determined in another manner during specific implementation. For example, a voltage domain with a relatively small quantity of tasks in the plurality of voltage domains may be used as the first voltage domain. A quantity of tasks in a voltage domain is a total quantity of tasks for execution on all processor cores in the voltage domain. Alternatively, in actual application, the load of the first voltage domain may be greater than a load of another voltage domain in the plurality of voltage domains. Specific implementation of determining the first voltage domain is not limited in this embodiment.

S402: Migrate a task to be executed by a processor core in the identified first voltage domain to a second voltage domain, where the second voltage domain is a voltage domain other than the first voltage domain in the device.

In addition to the first voltage domain, the device further includes the second voltage domain that does not meet the preset condition. For example, a load of the second voltage domain is greater than the load of the first voltage domain. For example, when identifying the first voltage domain that meets the preset condition, the device may also identify the second voltage domain. In an example, the device may identify, as the second voltage domain, a voltage domain whose load is greater than a second load threshold and less than or equal to a third load threshold in the plurality of voltage domains. Certainly, the second voltage domain may alternatively be determined in another manner. For example, the second voltage domain may be determined based on a quantity of tasks to be executed by the processor cores in the voltage domain.

The device may migrate all tasks to be executed by the processor core in the first voltage domain to the second voltage domain. To be specific, the device migrates all the tasks to be executed by the processor core in the first voltage domain to a processor core in the second voltage domain, so that the processor core in the second voltage domain processes the migrated tasks. In actual application, at least two queues, including a queue 1 and a queue 2, may be configured for the processor core in the first voltage domain. The queue 1 may be used to store a task that is being executed by the processor core, and the queue 2 may be used to store a task that is to be executed by the processor core. Likewise, two queues, namely, a queue 3 used to store a task that is being executed by the processor core and a queue 4 used to store a task that is to be executed by the processor core may also be configured for the processor core in the second voltage domain. In this case, that the scheduler in the device performs task migration may be specifically: The scheduler in the device migrates the to-be-executed task from the queue 2 to the queue 4, so that the processor core in the second voltage domain executes the tasks in the queue 4. In other words, tasks to be executed by a processor core include a task that is being executed by the processor core and a task that is to be executed by the processor core.

To make a load of the processor core in the second voltage domain relatively balanced in the second voltage domain, in a possible implementation, when migrating tasks from the first voltage domain to the second voltage domain, the device may allocate the tasks in the first voltage domain to one or more processor cores in the second voltage domain based on a load balancing policy. During specific implementation, the device may determine, based on a load status of each of the processor cores in the second voltage domain, a processor core to which each of the tasks is to be migrated and that is in the second voltage domain, and then migrate, based on a determined migration policy, each of the tasks to a corresponding processor core for execution. As a result, load distribution of the processor cores in the second voltage domain can satisfy the load balancing policy. A problem in which a processor core is overloaded but one or more other processor cores are underloaded in the second voltage domain after the task migration can be avoided as much as possible. In another possible implementation, the device may alternatively first migrate all the tasks from the first voltage domain to the second voltage domain, and then perform load balancing on all processor cores in the second voltage domain. In this embodiment, specific implementation of making a load of each processor core in the second voltage domain in a balanced state is not limited.

Figure 4:
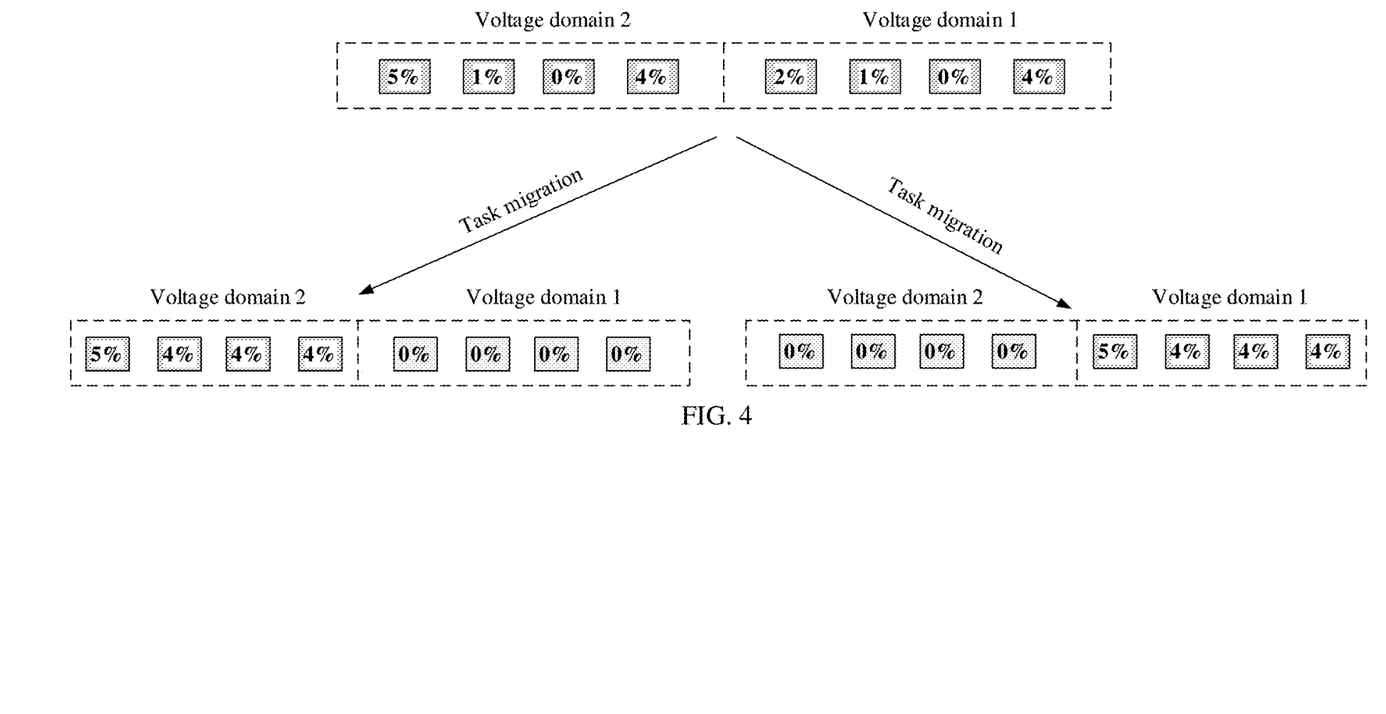
FIG. 4 is a schematic diagram of loads of processor cores in a voltage domain 1 and a voltage domain 2 before and after task migration according to this application.

As shown in FIG. 4, an example in which a device includes eight processor cores and the eight processor cores are grouped into two voltage domains (a voltage domain 1 and a voltage domain 2) is used for description. Loads of four processor cores in a voltage domain 1 are 5%, 1%, 0%, and 4%, and loads of four processor cores in a voltage domain 2 are 2%, 1%, 0%, and 4%. In this case, all tasks in the voltage domain 2 may be migrated to the voltage domain 1, and load balancing may be performed on each of the processor cores in the voltage domain 1 during or after task migration. After task migration, loads of all the processor cores in the voltage domain 1 and the voltage domain 2 are shown in the lower left part of FIG. 4. Certainly, in actual application, all tasks in the voltage domain 1 may alternatively be migrated to the voltage domain 2, and a load of each of the processor cores in the voltage domain 2 satisfies a load balancing policy. In this case, loads of all the processor cores in the voltage domain 1 and the second voltage domain 2 after task migration are shown in the lower right part of FIG. 4. Particularly, before task migration, a total load of the four processor cores in the voltage domain 1 is 10% (that is, 5%+1%+0%+4%), and is greater than a total load, which is 7% (that is, 2%+1%+0%+4%), of the four processor cores in the voltage domain 2. Therefore, a quantity of tasks to be migrated can be usually reduced as much as possible by migrating the tasks from the voltage domain 2 to the voltage domain 1.

It should be noted that, in this embodiment, a balance between loads of processor cores may mean that a difference between the loads of the different processor cores falls within a preset range. For example, as shown in FIG. 4, after load balancing is performed on the voltage domain 1 or the voltage domain 2, a difference between the loads of each two processor cores in the voltage domain 1 or the voltage domain 2 does not exceed 1%.

In actual application, based on a performance requirement of the device, the load of each processor core in the second voltage domain may be required not to exceed a load threshold allowed for the second voltage domain. Therefore, in some possible implementations, before migrating all the tasks to be executed by the processor core in the first voltage domain to the second voltage domain, the device may further determine, based on a load that will be caused by executing the to be migrated tasks and a status of a load that can be borne by the second voltage domain, whether all the tasks to be executed by the processor core in the first voltage domain can be migrated to the second voltage domain. Specifically, the device may first calculate a sum of the load of the first voltage domain and the load of the second voltage domain, and determine whether the sum of the loads is greater than a fifth load threshold corresponding to the second voltage domain. When the sum of the loads is not greater than the fifth load threshold, the device migrates all the tasks to be executed by the processor core in the first voltage domain to the second voltage domain. When the sum of the loads is greater than the fifth load threshold, the device may skip migrating the tasks, or migrate some of the tasks from the first voltage domain to the second voltage domain, or migrate all the tasks to a voltage domain with a lower load. Otherwise, the second voltage domain will be overloaded due to migration of the tasks from the first voltage domain to the second voltage domain. This affects task processing performance of the device. For example, a task processing delay is excessively large.

In some other possible implementations, the device may migrate all the tasks from the first voltage domain to the second voltage domain, when the device is in a low load scenario. In other words, the device may migrate the tasks of the processor core in the first voltage domain, when loads of all the voltage domains in the device each are less than a preset value. Specifically, the device may calculate the load of each of the voltage domains, and the load of each of the voltage domains is a sum of loads of processor cores in the voltage domain. Then, the device may further calculate a sum of the loads of all the voltage domains. In addition, when a total load of all the voltage domains is less than a fourth load threshold, the device is in the low load scenario, and the device may identify the first voltage domain from the plurality of voltage domains, and migrate the tasks in the first voltage domain. When the total load of all the voltage domains is not less than the fourth load threshold, the device is not in the low load scenario, and the device may skip performing the foregoing task migration process. The fourth load threshold may be, for example, a greatest load allowed for one voltage domain or a sum of greatest loads allowed for the plurality of voltage domains.

For example, when the device is an SMP device, whether the device is in the low load scenario may be determined based on the following formula:

total_until_avg<$pd\_capability \times 80\% \times N$, where total_until_avg is a sum of loads of all processor cores in the device, pd_capability is a computing capability of one voltage domain, pd_capability×80% is the greatest load allowed for one voltage domain, N is a quantity of voltage domains, and pd_capability×80%×N is the fourth load threshold. When a value of N is 1, the fourth load threshold is the greatest load allowed for one voltage domain. When a value of N is greater than 1, the fourth load threshold is the sum of the greatest loads allowed for the plurality of voltage domains. Certainly, the foregoing formula is merely used as an example for description, and is not intended to limit specific implementation of determining whether the device is in the low load scenario to the example.

S403: Set each of working modes of components in the first voltage domain as a first mode, where the components include the processor core.

In this embodiment, the components in the first voltage domain include energy-consuming components in the first voltage domain, including the processor core, and one or more other components, such as a QPI bus, and an on-die memory controller, configured to support working of the processor core. A chip (which may also be referred to as a package) packaged in one chip or unit or logic circuit may include one or more voltage domains. For example, a processor chip is a chip with a processor core such as Intel® Xeon® Gold 6148 CPU @ 2.40 GHz, and may include two or more voltage domains.

After the device migrates all the tasks to be executed by the processor core in the first voltage domain to the second voltage domain, there may be no to-be-executed task or a smaller quantity of to-be-executed tasks on the processor core in the first voltage domain. In this case, after the tasks are migrated, and the processor core in the first voltage domain finishes executing tasks that are being executed, the device may set each of the working modes of all the components (for example, an entire package) in the first voltage domain to a mode with relatively low power consumption, which is referred to as the first mode hereinafter. In this case, the processor core and a component associated with the processor core are in a same working mode.

Generally, when any processor core in the first voltage domain does not enter the first mode, one or more other components in the first voltage domain cannot enter the first mode, and the package cannot be set as the first mode. When working modes of all processor cores in the first voltage domain each are set as the first mode, working modes of the one or more other components that are in the first voltage domain and that are configured to support working of the processor cores each can be set as the first mode.

Power consumption of the processor cores in the second voltage domain increases due to an increase in to-be-executed tasks. However, in actual application, a load and power consumption of the processor core are generally in a near-linear relationship. Therefore, a decrease in power consumption of the processor core in the first voltage domain may be approximately offset by an increase in power consumption of the processor cores in the second voltage domain. A decrease in energy consumption of the entire device usually lies in a decrease in power consumption of the one or more other components associated with the processor cores in the first voltage domain. Therefore, the working modes of the processor cores and non-core components in the first voltage domain each are set as the first mode with low power consumption, so that power consumption of the entire device can be effectively reduced. Additional power consumption caused by task migration is usually far less than an amount by which the power consumption of the one or more other components associated with the processor cores in the first voltage domain. Therefore, the additional power consumption caused by task migration may be ignored in this embodiment.

For example, the device may support the processor core to be in a plurality of different working modes. For example, the device may support a processor core of Intel® Xeon® Gold 6148 CPU @ 2.40 GHz to be in four different working modes: C0, C1, C1E, and C6. The mode C0 is a normal working mode, and power consumption of the processor core in the mode C0 is usually higher than power consumption of the processor core in other working modes. The mode C6 is a deep energy-saving mode, and power consumption of the processor core in the mode C6 is usually lower than power consumption of the processor core in other working modes. Power consumption of the processor core decreases sequentially in the four different working modes C0, C1, C1E, and C6. Certainly, the device may further support one or more other possible working modes, which is not limited in this embodiment.

In this embodiment, before the tasks are migrated from the first voltage domain to the second voltage domain, a working mode of each processor core in the first voltage domain may be a second mode. After the device migrates the tasks, the device may set the working mode of each processor core in the first voltage domain as the first mode. Power consumption of the processor core in the first mode is less than power consumption of the processor core in the second mode. For example, the second mode may be the mode C0, and the first mode may be the mode C1, the mode C1E, or the mode C6.

It should be noted that different working modes may have different stay duration requirements for the processor core. The stay duration is duration for which the processor core is required to stay in the working mode, or the stay duration may be represented by an operating frequency of the processor core in a working mode. Usually, there is additional power consumption when the processor core enters and exits the working mode. When duration for which the processor core can stay in the working mode reaches the stay duration (or the frequency), power consumption that can be saved by the device can be offset by the additional power consumption caused when the processor core enters and exits the working mode. In addition, a case in which the processor core frequently switches the working mode of the processor core because of entering into an improper working mode can be avoided. Each of the working modes from C1 to C6 has corresponding stay duration.

Therefore, in some possible implementations, when setting the working modes of all the components in the first voltage domain, the device may predict idle duration of the processor core in the first voltage domain. The idle duration is duration in which the processor core does not execute a task. Then, the device may compare the idle duration with stay duration corresponding to each working mode, to determine longest stay duration that is less than the idle duration. A working mode corresponding to the longest stay duration is the first mode. The device may set each of working modes of all processor cores and non-core components in the first voltage domain as the first mode.

For example, camping duration corresponding to the working modes C1, C1E, and C6 is 2 µs (microsecond), 10 µs, and 50 µs. If the device predicts that idle duration of the processor core in the first voltage domain is 55 µs, and 55 µs is greater than 50 µs, the device may select the working mode C6 as the first mode, and set the working mode of the processor core in the first voltage domain to the mode C6. If the device predicts that idle duration of the processor core in the first voltage domain is 30 s, and 10 µs<30 µs<50 µs, the device may select the working mode C1E as the first mode, and set the working modes of the processor core and the non-core component in the first voltage domain to the mode C1E.

For example, that the device predicts the idle duration of the processor core may be specifically: The device calculates, based on predicted idle duration and actual idle duration of the processor core in a plurality of different time periods in the past, a ratio of the predicted idle duration to the actual idle duration in each time period, so as to obtain ratios corresponding to the plurality of different time periods. Then, the device may adjust, by using a dynamic average algorithm, current predicted initial idle duration based on the ratios corresponding to the plurality of time periods, to obtain final predicted idle duration. For example, the device may calculate an average value of the plurality of ratios, and use a product of the average value and the initial idle duration as idle duration that is of the processor core and that is predicted by the device in a current time period.

Certainly, the device may predict the idle duration of the processor core in another manner, or may determine the first mode in another manner or by using a computing process that is more complex/simplified than that in the foregoing example. This is not limited in this embodiment.

In addition, after a task executed by the processor core in the second voltage domain is increased, the device may further adjust an operating frequency of the processor core based on a load of the processor core, for example, increase the operating frequency of the processor core, so that the processor core can execute more tasks in a unit time, thereby ensuring that performance of the device is not reduced as much as possible.

In some actual application scenarios, some of the plurality of voltage domains in the device may be overloaded. For example, loads of the some voltage domains each may exceed a second load threshold allowed for the voltage domains, and the device may perform load balancing on the some voltage domains. The device may determine, based on a quantity of voltage domains whose loads each exceed the second load threshold, whether to perform partial load balancing or overall load balancing. Specifically, the device may determine, based on the loads of the voltage domains, a quantity of voltage domains whose loads each are greater than the second load threshold in the plurality of voltage domains. When the quantity is greater than the preset quantity, the device may perform load balancing on the plurality of voltage domains based on the load statuses of the plurality of voltage domains. When the quantity is less than the preset quantity, the device may perform load balancing on some of the voltage domains based on load statuses of the some of the plurality of voltage domains, where the some of the voltage domains include a voltage domain whose load is greater than the second load threshold and a voltage domain whose load is less than the second load threshold.

For example, it is assumed that the device includes 80 processor cores, and the 80 processor cores may be grouped into 20 voltage domains. When there are five or less voltage domains whose loads each are greater than the second load threshold, 10 voltage domains whose loads each are less than the second load threshold may be selected, and load balancing is performed on the voltage domains whose loads each are greater than the second load threshold and the selected 10 voltage domains. When there are more than five voltage domains whose loads each are greater than the second load threshold, the device may perform load balancing on the 20 voltage domains.

Figure 5:
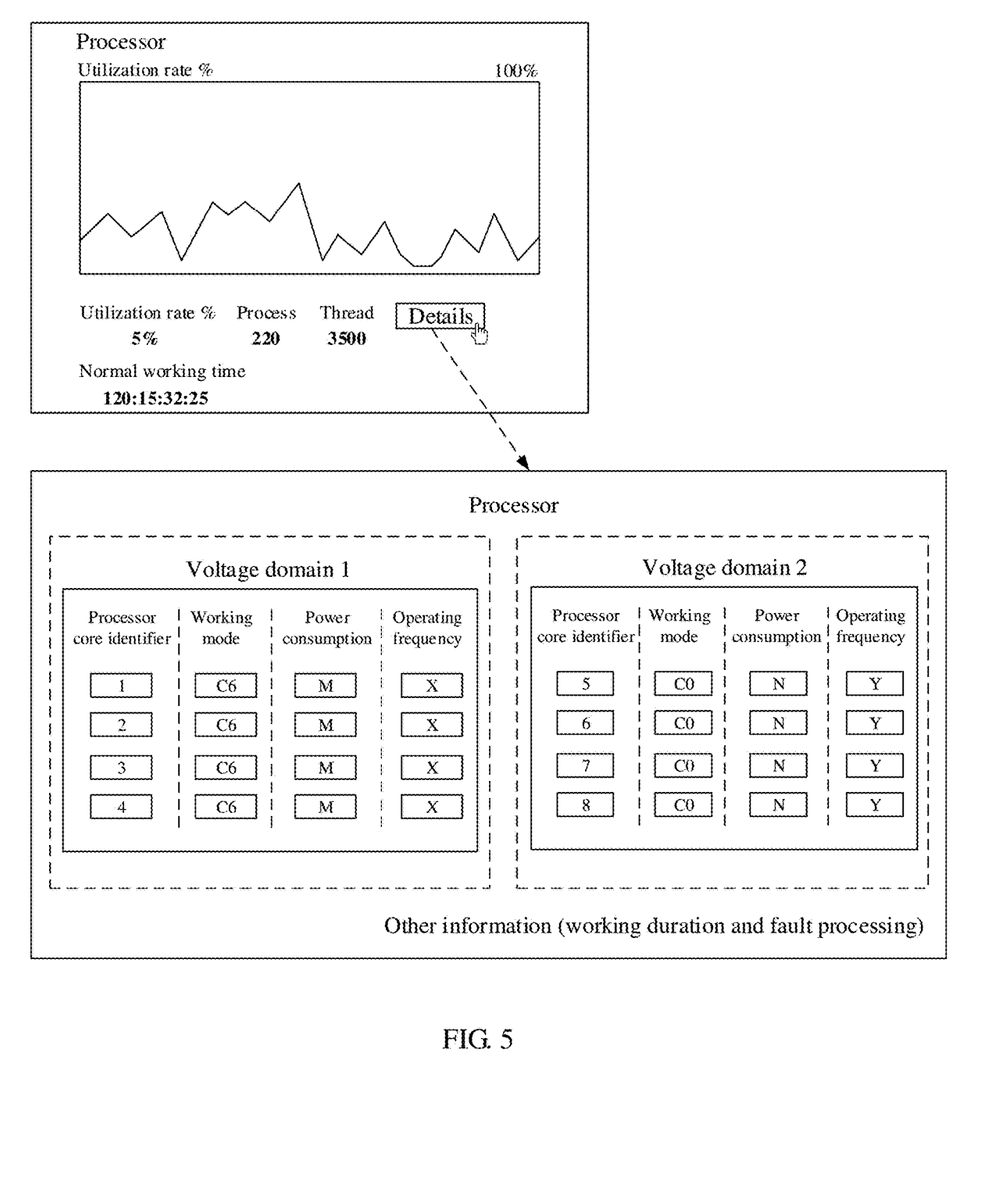
FIG. 5 is a schematic diagram of a display interface according to this application.

Further, when performing power consumption management, the device may further present a power consumption management result of the device for a user to view. For example, the power consumption management result of the device may include information of components at different levels, such as information of a processor, information of a voltage domain, and information of a processor core. For example, the power consumption management result may include a power consumption management result of each processor, a power consumption management result of each voltage domain in each processor, and a power consumption management result of each processor core in each voltage domain. In an example, the device may present the power consumption management result of the device on a preset display interface. The preset display interface may be located on the device. Alternatively, the device may transmit the power consumption management result to another device, and the power consumption management result is presented on a display interface of the another device. The power consumption management result presented on the preset display interface may include any one or more of information such as power consumption, an identifier, and a utilization rate that are of a processor, information such as power consumption and an identifier that are of each voltage domain, information such as a temperature of a component (including a temperature of a processor core and a temperature of a component associated with the processor core), and information such as an identifier, a working mode, power consumption, an operating frequency, a voltage, a utilization rate, and a proportion of duration of staying in each working mode that are of a processor core in each voltage domain. As shown in FIG. 5, a utilization rate, a dynamic change curve and value of the utilization rate, quantities of working processes and threads, a normal working time, and the like that are of a processor in the device may be presented on an interface. When the user expects to further view related information of the processor, the user may view, by tapping "Details", information such as identifiers of different voltage domains in the processor, an identifier of a processor core, a working mode of the processor core, and power consumption and an operating frequency that are of the processor core on a pop-up display interface. Further, the user may tap "Other information" on the display interface to view other related information of the processor, for example, information such as working duration and fault processing of the processor core; or the user may tap "Other information" on the display interface to view information of one or more other components associated with the processor core in the first voltage domain, for example, information such as temperatures, utilization rates, and loads that are of the one or more components (not shown in the figure).

In this embodiment, one first voltage domain is used as an example for description. In actual application, the device may migrate tasks from a plurality of first voltage domains to another voltage domain. Certainly, a quantity of first voltage domains on which task migration is to be performed is less than a total quantity of voltage domains in the device. For a specific implementation process of identification, task migration, and working mode setting that are of each first voltage domain and that are performed by the device, refer to related descriptions in the foregoing embodiments. Details are not described herein again.

It should be noted that, for brief description, the foregoing method embodiments are represented as a series of combinations of actions. However, a person skilled in the art should appreciate that this application is not limited to the described action sequence.

Another appropriate step combination that can be figured out by a person skilled in the art based on the content described above also falls within the protection scope of this application. In addition, a person skilled in the art should also be aware that embodiments described in this specification are all preferred embodiments, and the involved actions are not necessarily mandatory for this application.

The foregoing describes in detail the power consumption management method provided in this application with reference to FIG. 1 to FIG. 5. The following describes a power consumption management apparatus and device provided in this application with reference to FIG. 6 to FIG. 7.

Figure 6:
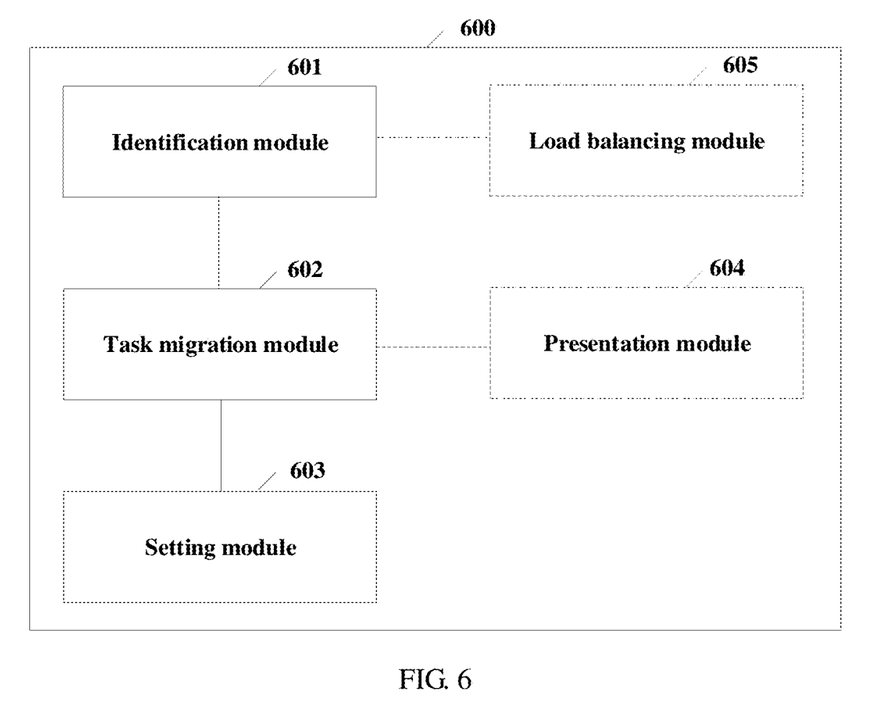
FIG. 6 is a schematic structural diagram of a power consumption management apparatus according to this application.

FIG. 6 shows a power consumption management apparatus 600 according to this application. The power consumption management apparatus 600 may be used in a device including a plurality of voltage domains, and each of the voltage domains includes at least one processor core. The power consumption management apparatus 600 may include: an identification module 601, configured to identify a first voltage domain that meets a preset condition, where the first voltage domain is any voltage domain in the device; a task migration module 602, configured to migrate a task to be executed by a processor core in the first voltage domain to a second voltage domain, where the second voltage domain is a voltage domain other than the first voltage domain in the device; and a setting module 603, configured to set each of working modes of components in the first voltage domain as a first mode, where the components include the processor core.

It should be understood that the apparatus 600 in this embodiment of this application may be implemented by using an application-specific integrated circuit (ASIC) or a programmable logic device (PLD). The PLD may be a complex programmable logic device (CPLD), a field-programmable gate array (FPGA), a generic array logic (GAL), or any combination thereof. Alternatively, when the power consumption management method shown in FIG. 3 is implemented by software, the apparatus 600 and each module in the apparatus 600 may be software modules.

In a possible implementation, the identification module 601 is specifically configured to: identify the first voltage domain based on load statuses of the plurality of voltage domains in the device, where a load of the first voltage domain meets the preset condition.

In a possible implementation, the identification module 601 is specifically configured to: select, as the first voltage domain based on a load sequence of the plurality of voltage domains, a voltage domain whose load is less than or equal to a first load threshold in the plurality of voltage domains.

In a possible implementation, the first load threshold is a load value of a voltage domain with a lowest load in the plurality of voltage domains.

In a possible implementation, the identification module is specifically configured to: identify the first voltage domain according to a preset load balancing policy.

In a possible implementation, the identification module 601 is further configured to: identify the second voltage domain based on the load statuses of the plurality of voltage domains in the device, where a load of the second voltage domain is greater than a second load threshold, and the second voltage domain is a voltage domain whose load status is less than or equal to a third load threshold.

In a possible implementation, the identification module 601 is specifically configured to: when a total load of the plurality of voltage domains is less than a fourth load threshold, identify the first voltage domain that meets the preset condition.

In a possible implementation, the identification module 601 is further configured to: before identifying the first voltage domain that meets the preset condition, identify a correspondence between a processor core and a voltage domain in the device.

In a possible implementation, the setting module is specifically configured to: predict idle duration of the processor core in the first voltage domain; and set each of the working modes of the components in the first voltage domain as the first mode based on the idle duration.

In a possible implementation, the power consumption management apparatus 600 further includes: a presentation module 604, configured to present a power consumption management result on a preset display interface, where the power consumption management result includes any one or more of an identifier and power consumption that are of each of the plurality of voltage domains, an identifier, a working mode, power consumption, an operating frequency, a voltage, a utilization rate, and a proportion of duration of staying in the first mode that are of a processor core, and a temperature of a component.

In a possible implementation, after the task is migrated to the second voltage domain, load distribution of the processor core in the second voltage domain satisfies the load balancing policy, where the load balancing policy is used to balance a load of the processor core in the first voltage domain.

In a possible implementation, the power consumption management apparatus 600 further includes: a load balancing module 605, configured to: when a quantity of voltage domains whose loads each are greater than the second load threshold in the plurality of voltage domains is greater than a preset quantity, perform load balancing on the plurality of voltage domains based on the load statuses of the plurality of voltage domains.

In a possible implementation, a load of the second voltage domain is not greater than a fifth load threshold.

In a possible implementation, voltages of processor cores in the voltage domain can be regulated together.

The power consumption management apparatus 600 according to this embodiment of this application may correspondingly perform the method described in embodiments of this application, and the foregoing and other operations and/or functions of each unit in the power consumption management apparatus 600 are intended to implement corresponding procedures of the method in FIG. 3. For brevity, details are not described herein again.

Figure 7:
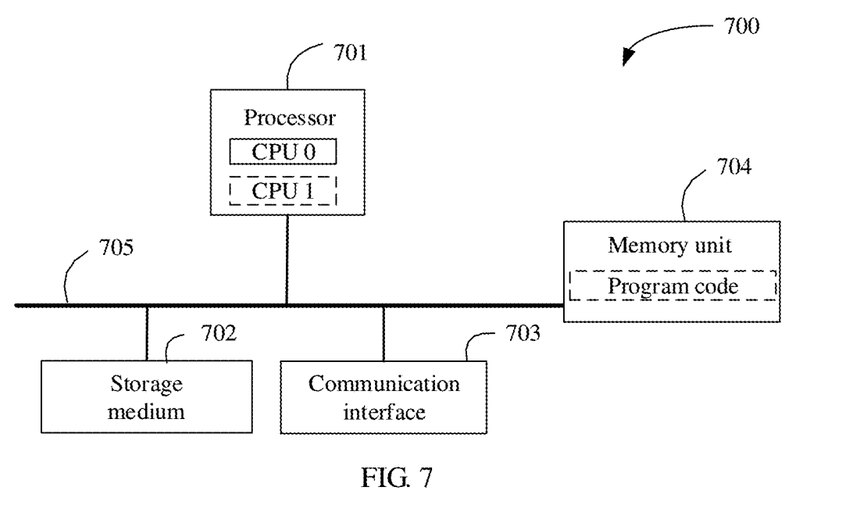
FIG. 7 is a schematic structural diagram of a scheduler according to this application.

FIG. 7 is a schematic diagram of a scheduler 700 according to this application. As shown in the figure, the scheduler 700 includes a processor 701, a storage medium 702, a communication interface 703, and a memory unit 704. The processor 701, the storage medium 702, the communication interface 703, and the memory unit 704 communicate with each other by using a bus 705, or may implement communication by using another means such as wireless transmission. The storage medium 702 is configured to store instructions. The processor 701 is configured to execute the instructions stored in the memory 702. The memory 702 stores program code, and the processor 701 may invoke the program code stored in the memory 702 to perform the following operations: identifying a first voltage domain that meets a preset condition, where the first voltage domain is any voltage domain in a device, the device includes a plurality of voltage domains, and each of the voltage domains includes at least one processor core; migrating a task to be executed by a processor core in the first voltage domain to a second voltage domain, where the second voltage domain is a voltage domain other than the first voltage domain in the device; and setting each of working modes of components in the first voltage domain as a first mode, where the components include the processor core.

It should be understood that in this embodiment of this application, the processor 701 may be a CPU, or the processor 701 may be another general-purpose processor, a digital signal processor (DSP), an application-specific integrated circuit (ASIC), a field programmable gate array (FPGA), or another programmable logic device, a discrete gate or transistor logic device, a discrete hardware component, or the like. A general-purpose processor may be a microprocessor, or may be any conventional processor or the like.

The memory 702 may include a read-only memory and a random access memory, and provide instructions and data to the processor 701. The memory 702 may further include a nonvolatile random access memory. For example, the memory 702 may further store information of a device type.

The memory 702 may be a volatile memory or a nonvolatile memory, or may include both a volatile memory and a nonvolatile memory. The nonvolatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example but not limitation, many forms of RAMs may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

The communication interface 703 is used for communication with another device connected to the scheduler 700. For example, the scheduler 700 may obtain, through the communication interface 703, a voltage domain grouping status in the device including the plurality of voltage domains. The bus 705 may further include a power bus, a control bus, a status signal bus, and the like, in addition to a data bus. However, for clear description, various types of buses in the figure are marked as the bus 705.

It should be understood that the scheduler 700 according to this embodiment of this application may correspond to the power consumption management apparatus 600 according to the embodiment of this application, and may correspond to an entity that performs the method shown in FIG. 3 according to the embodiment of this application. In addition, the foregoing and other operations and/or functions of each module in the scheduler 700 are intended to implement corresponding procedures of the method in FIG. 3. For brevity, details are not described herein again.

In addition, this application further provides a device. The device may include the scheduler 700 shown in FIG. 7, and the device may implement corresponding procedures of the method in FIG. 3. For brevity, details are not described herein again.

Furthermore, this application further provides a computer program product, where the computer program product includes one or more computer instructions. When the computer program instructions are loaded and executed on the computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium that can be stored by the computer, or a data storage device, such as a training device or a data center, integrating one or more usable media. The usable medium may be a magnetic medium (for example, a floppy disk, a hard disk, or a magnetic tape), an optical medium (for example, DVD), a semiconductor medium (for example, a solid-state drive (SSD)), or the like.

In the specification, claims, and accompanying drawings of this application, the terms "first", "second", and the like are intended to distinguish between similar objects but do not necessarily indicate a specific order or sequence. It should be understood that the terms used in such a way are interchangeable in proper circumstances, and this is merely a discrimination manner for describing objects having a same attribute in embodiments of this application.

In addition, it should be noted that the described apparatus embodiment is merely an example. The units described as separate parts may or may not be physically separate, and parts displayed as units may or may not be physical units, may be located in one position, or may be distributed on a plurality of network units. Some or all of the modules may be selected based on an actual requirement to achieve the objectives of the solutions of this application. In addition, in the accompanying drawings of the apparatus embodiments provided in this application, connection relationships between modules indicate that the modules have communication connections with each other, which may be specifically implemented as one or more communication buses or signal cables.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A method, wherein the method is applied to a device comprising a plurality of voltage domains and a plurality of processor cores, each voltage domain of the plurality of voltage domains comprises at least one processor core from the plurality of processor cores, and the method comprises:
    identifying a correspondence between each of the plurality of voltage domains and each of the at least one processor cores from the plurality of processor cores;
    identifying a first voltage domain of the device that meets a preset condition;

migrating a task to be executed by a processor core in the first voltage domain to a second voltage domain of the device; and setting a working mode of each component in the first voltage domain as a first mode, wherein components of the first voltage domain comprise the at least one processor core and at least one other electronic component in the first voltage domain.

2. The method according to claim 1, wherein identifying the first voltage domain of the device that meets the preset condition comprises:

identifying the first voltage domain based on load statuses of the plurality of voltage domains in the device, wherein a load of the first voltage domain meets the preset condition.

3. The method according to claim 2, wherein identifying the first voltage domain based on the load statuses of the plurality of voltage domains in the device comprises:

selecting, as the first voltage domain, based on a load sequence of the plurality of voltage domains, a voltage domain whose load is less than or equal to a first load threshold in the plurality of voltage domains.

4. The method according to claim 3, wherein the first load threshold is a load value of a voltage domain with a lowest load in the plurality of voltage domains.

5. The method according to claim 1, wherein identifying the first voltage domain of the device that meets the preset condition comprises:

identifying the first voltage domain according to a preset load balancing policy.

6. The method according to claim 1, further comprising:

identifying the second voltage domain based on load statuses of the plurality of voltage domains in the device, wherein a load of the second voltage domain is greater than a second load threshold, and the second voltage domain is a voltage domain whose load is less than or equal to a third load threshold.

7. The method according to claim 1, wherein identifying the first voltage domain of the device that meets the preset condition comprises:

when a total load of the plurality of voltage domains is less than a fourth load threshold, identifying the first voltage domain that meets the preset condition.

8. The method according to claim 1, wherein setting the working mode of each component in the first voltage domain as the first mode comprises:

predicting an idle duration of the processor core in the first voltage domain; and setting the working mode of each component in the first voltage domain as the first mode based on the idle duration.

9. The method according to claim 1, further comprising:

presenting a power consumption management result on a preset display interface, wherein the power consumption management result comprises any one or more of:

an identifier and power consumption that are of each voltage domain of the plurality of voltage domains, an identifier, a working mode, power consumption, an operating frequency, a voltage, a utilization rate, or a proportion of duration of staying in the first mode that are of a processor core, or a temperature of a component of the device.

10. A device, comprising:

a scheduler; and a plurality of voltage domains and a plurality of processor cores, wherein each voltage domain of the plurality of voltage domains comprises at least one processor core from the plurality of processor cores, and wherein the scheduler is configured to:

identify a correspondence between each of the plurality of voltage domains and each of the at least one processor cores from the plurality of processor cores;

identify a first voltage domain of the device that meets a preset condition;

migrate a task to be executed by a processor core in the first voltage domain to a second voltage domain of the device; and set a working mode of each component in the first voltage domain as a first mode, wherein components of the first voltage domain comprise the at least one processor core and at least one other electronic component in the first voltage domain.

11. The device according to claim 10, wherein the scheduler is configured to identify the first voltage domain of the device based on load statuses of the plurality of voltage domains in the device, wherein a load of the first voltage domain meets the preset condition.

12. The device according to claim 11, wherein the scheduler is configured to select, as the first voltage domain, based on a load sequence of the plurality of voltage domains, a voltage domain whose load is less than or equal to a first load threshold in the plurality of voltage domains.

13. The device according to claim 12, wherein the first load threshold is a load value of a voltage domain with a lowest load in the plurality of voltage domains.

14. The device according to claim 10, wherein the scheduler is configured to identify the first voltage domain of the device according to a preset load balancing policy.

15. The device according to claim 10, wherein the scheduler is further configured to identify the second voltage domain based on load statuses of the plurality of voltage domains in the device, wherein a load of the second voltage domain is greater than a second load threshold, and the second voltage domain is a voltage domain whose load is less than or equal to a third load threshold.

16. The device according to claim 10, wherein the scheduler is configured to:

when a total load of the plurality of voltage domains is less than a fourth load threshold, identify the first voltage domain of the device that meets the preset condition.

17. The device according to claim 10, wherein the scheduler is configured to:

predict an idle duration of the processor core in the first voltage domain; and set the working mode of each component in the first voltage domain as the first mode based on the idle duration.

18. The device according to claim 10, wherein the scheduler is further configured to:

present a power consumption management result on a preset display interface, wherein the power consumption management result comprises any one or more of an identifier and power consumption that are of each voltage domain of the plurality of voltage domains, an identifier, a working mode, power consumption, an operating frequency, a voltage, a utilization rate, or a proportion of duration of staying in the first mode that are of a processor core or a temperature of a component.

* * * * *